United States Patent Office 3,417,117
Patented Dec. 17, 1968

3,417,117
ORGANOTIN CARBONATES, THEIR THIO-ANALOGS AND THE PREPARATION THEREOF
Alwyn George Davies, London, England, assignor to M & T Chemicals Inc., New York, N.Y., a corporation of Delaware
No Drawing. Filed Oct. 26, 1964, Ser. No. 406,570
6 Claims. (Cl. 260—429.7)

ABSTRACT OF THE DISCLOSURE

In accordance with certain of its aspects, this invention relates to novel compounds and to a process for preparing a novel compound having the general formula $$R_nSn(Z-A-XR')_{4-n}$$
$$\parallel$$
$$Z$$

in which R' is selected from the group consisting of alkyl, aryl, alkenyl, hydrogen and $SnR_3$; A is selected from the group consisting of carbon and sulfur; X is selected from the group consisting of oxygen and peroxide; Z is selected from the group consisting of oxygen and sulfur; Z is different from A; R is selected from the group consisting of alkyl, aryl, alkenyl, and n is 0, 1, 2 or 3, which method comprises reacting together Z=A=Z with an organotin compound having the formula $R_nSn(XR')_{4-n}$ or $$(R_3Sn)_2O$$

---

This invention relates to the preparation of organotin esters. More particularly, it relates to the preparation of certain organotin compounds which may be used in fungicidal preparations.

It is an object of this invention to provide a novel process for preparing novel organotin esters in high yield from relative inexpensive and easily handled reactants. Other objects will become apparent to those skilled in the art upon reading the following description.

In accordance with certain of its aspects, this invention relates to a process for preparing a novel compound having the general formula:

$$R_nSn(-Z-A-XR')_{4-n}$$
$$\parallel$$
$$Z$$

in which R' is selected from the group consisting of alkyl, aryl, alkenyl, hydrogen and $SnR_3$; A is selected from the group consisting of carbon and sulphur; X is selected from the group consisting of oxygen and peroxide; Z is selected from the group consisting of oxygen and sulphur; Z is different from A; R is selected from the group consisting of alkyl, aryl and alkenyl, and n is 0, 1, 2 or 3, which method comprises reacting together Z=A=Z with an organotin compound having the formula $$R_nSn(XR')_{4-n} \text{ or } (R_3Sn)_2O$$

The present invention also includes compounds having the general formula:

$$R_nSn(-Z-A-XR')_{4-n}$$
$$\parallel$$
$$Z$$

R' is selected from the group consisting of alkyl, aryl, alkenyl, hydrogen and $SnR_3$; A is selected from the group consisting of carbon and sulphur; X is selected from the group consisting of oxygen and peroxide; Z is selected from the group consisting of oxygen and sulphur; Z is different from A; R is selected from the group consisting of alkyl, aryl and alkenyl, and n is 0, 1, 2 or 3.

The process of this invention may be carried out by reacting with Z=A=Z a compound selected from the group consisting of $R_3SNXR'$ wherein R is selected from the group consisting of alkyl, aryl, and alkenyl, and X and R' are defined above. Typically, R may be any of the alkyl, aryl and alkenyl radicals as hereinafter described. Preferably, R may be phenyl or lower alkyl, i.e. alkyl containing less than about 10 carbon atoms.

R may be selected from the group consisting of alkyl, aryl, alkenyl, and hydrogen, including such radicals when inertly substituted. For example, R may be alkyl including methyl, ethyl, n-propyl, isopropyl, n-butyl, isobutyl, sec-butyl, tert-butyl, n-amyl, neopentyl, isoamyl, n-hexyl, isohexyl, heptyls, octyl, decyl, dodecyl, tetradecyl, octadecyl, cyclopentyl, cyclohexyl, cycloheptyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may also be an inertly substituted radical of the type hereinbefore described. Typical inert substitutents which may be present include alkyl, aryl, cycloalkyl, aralkyl, alkaryl, alkenyl, ether, halogen, etc. Typical substituted alkyls include trichloromethyl, 3-chloropropyl, 2-ethoxyethyl, benzyl, 4-methylcyclohexyl, 4-chlorocyclohexyl, β-phenylethyl, etc. Typical inertly subsituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl.

X may be selected from the group consisting of oxygen and peroxide and, preferably, X may be oxygen. When X is oxygen, and when n is 3, the $R_3SnXR'$ may typically be triethyltin methoxide, tri-n-propyltin ethoxide, tri-n-butyltin methoxide, tri-n-amyltin phenoxide, tribenzyltin n-butoxide, tricyclohexyltin methoxide, triphenyltin 2-ethylhexoxide, tritolyltin isopropoxide or triallyltin methoxide.

The compound $(R_3Sn)_2O$ may be bis(triethyltin) oxide, bis(tri-n-propyltin) oxide, bis(tri-n-butyltin) oxide, bis(tri-n-amyltin) oxide, bis(tribenzyltin) oxide, bis(tricyclohexyltin) oxide, bis(triphenyltin) oxide, bis(tritolyltin) oxide, bis(triallyltin) oxide.

As is well-known to those skilled in the art, the compounds of the formula $(R_3Sn)_2O$ may exist in equilibrium with $R_3SnOH$, e.g. triethyltin hydroxide, triphenyltin hydroxide, tricyclohexyltin hydroxide, etc. Depending upon conditions, either of the equilibrium compounds may predominate. Either of the equilibrium compounds, and mixtures of both, may be employed in the practice of this invention.

The process of this invention typically takes place as follows:

(I) $R_3SnXR' + Z{=}A{=}Z \longrightarrow R_3Sn-Z-A-XR'$
$\phantom{xxxxxxxxxxxxxxxxxxxxxxxxxxxxxxxxxxx}\parallel$
$\phantom{xxxxxxxxxxxxxxxxxxxxxxxxxxxxxxxxxxx}Z$ or typically:

(Ia) $\quad R_3SnOR' + CO_2 \rightarrow R_3SnOCOOR'$ (II) $\quad (R_3Sn)_2X + Z{=}A{=}Z \longrightarrow R_3Sn-Z-A-X-SnR_3$
$\phantom{xxxxxxxxxxxxxxxxxxxxxxxxxxxxxxxxxxxxxxx}\parallel$
$\phantom{xxxxxxxxxxxxxxxxxxxxxxxxxxxxxxxxxxxxxxx}Z$ or typically:

(IIa) $\quad (R_3Sn)_2O + CO_2 \rightarrow R_3SnOCO-OSnR_3$

The reaction, as represented by Equations I and II, may be effected by placing the desired organotin reactant in a reaction vessel and contacting it with the reactant Z=A=Z, typically carbon dioxide. Preferably, when the reactant Z=A=Z is a gas, this may preferably be done by bubbling the gas through the organotin compound. Typically, the reaction may be exothermic. It is generally preferred that the reaction mixture be maintained at moderate temperature, say to 0° C. to 100° C. preferably 0 to 50° C., and cooling means may be provided to maintain the desired temperature. Most conveniently, the reaction may be conducted at atmospheric pressure, but increased or reduced pressure may be maintained if desired.

In order to provide fluidity, good heat transfer, and to prevent local overheating, it may be desired to carry out the reaction in the presence of an inert solvent. Useful inert solvents include hydrocarbons such as benzene, toluene, n-heptane, ligroin, petroleum ether, and inert ethers such as ethyl ether, n-propyl ether, n-butyl ether, tetrahydrofuran, tetrahydropyran, 2-methyltetrahydrofuran, 2-ethoxytetrahydropyran, tetrahydrofurfuryl ethyl ether, etc.

It may be desirable to use mixtures of one or more of these solvents, typically a mixture of toluene and tetrahydrofuran. Preferably, the solvent or mixture of solvents to be employed may be selected so as to have a boiling point or boiling range which permits ready separation by distillation from the desired product. Typically, it may be found that solvent having a boiling point which is more than 20° C. different from (i.e. higher or lower than) that of the desired product may be employed to facilitate separation by distillation. At the completion of the reaction time as hereinbefore noted, the desired product may be recovered by distilling off the solvent and thereafter distilling off the desired product preferably under reduced pressure of about 0.5–760, say 20 mm. Hg. As will be apparent, where the solvent chosen has a boiling point lower than that of the desired product, the solvent may be distilled off first. When the solvent chosen has a higher boiling point than that of the desired product, the product may be recovered first.

The novel compound

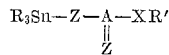

which may be prepared and recovered from Reaction I may include: triethyltin methyl carbonate, triethyltin n-propyl xanthate, triethyltin ethyl sulfite, tri-n-propyltin n-butyl carbonate, tri-n-propyltin methyl xanthate, tri-n-propyltin methyl sulfite, tri-n-butyltin n-propyl sulfite, tri-n-amyltin cyclohexyl carbonate, tri-n-amyltin phenyl xanthate, tri-n-amyltin benzyl sulfite, tri-n-amyltin ethyl, tribenzyltin methyl carbonate, tribenzyltin n-butyl xanthate, tribenzyltin allyl sulfite, tricyclohexyltin benzyl carbonate, tricyclohexyltin methyl xanthate, tricyclohexyltin phenyl sulfite, triphenyltin ethyl carbonate, triphenyltin ethyl xanthate, triphenyltin n-propyl sulfite, tritolyltin n-butyl carbonate, tritolyltin benzyl xanthate, tritolyltin lauryl sulfite, triallyltin 2-ethylhexyl carbonate, triallyltin isopropyl xanthate, triallyltin ethyl sulfite.

There is some indication that the novel compounds of the present invention can be reacted with alcohols having the general formula R'OH and thiols having the general formula R'SH to form esters in accordance with the following reactions:

(III) 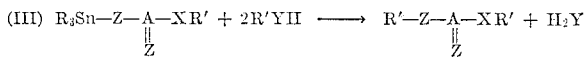

or typically:

(IIIa) $R_3SnOCOOR' + 2R'OH \rightarrow$
$R'OCOOR' + R'_3SnOR' + H_5O$ (IV) 

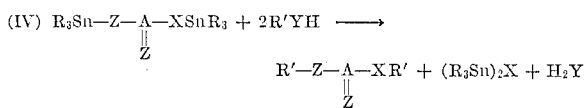

or typically:

(IVa) $R_3SnOCOOSnR_3 + 2R'OH \rightarrow$
$R'OCOOR' = (R_3Sn)_2O + H_2O$ in which Y is sulphur or oxygen.

Practice of the present invention may be observed from the following illustrative examples.

Example 1.—Reaction of tributyltin methoxide with carbon dioxide (a) A solution of tributyltin methoxide (0.8608 gm.) in benzene (5 cc.) was immersed in carbon dioxide in a gas burette at room temperature. 1.06 mol of carbon dioxide was taken up in 30 minutes. The benzene solvent was removed under reduced pressure leaving methyl tributyltin carbonate as an oil.

(b) Dry carbon dioxide was bubbled through a solution of tributyltin methoxide (0.995 gm.) in pentane (7 cc.) for one hour. The solvent (pentane) was removed under reduced pressure, and the methyl tributyltin carbonate was recovered as an oil.

The infra-red spectrum of the product differed from that of the original methoxide in that it showed the presence of a carbonyl group. When the material was exposed to the air a rapid reaction took place, the product of which was found to have an infra-red spectrum which corresponded with that of bis(tributyltin) carbonate.

Example 2.—Reaction of bis(tributyltin) oxide with carbon dioxide

Dry carbon dioxide was bubbled through a solution of bis(tributyltin) oxide (1.079 gm.) in dry pentane (5 cc.). The solution became warm and the viscosity of the solution increased. On subsequent removal of the solvent under reduced pressure, bis(tributyltin) carbonate remained as an air stable viscous oil.

Example 3.—Reaction of tributyltin methoxide with carbon disulphide

A slight excess of carbon disulphide was added to tributyltin methoxide in the absence of solvents. A slightly exothermic reaction occurred to produce methyl tributyltin dithiocarbonate. An infra-red analysis of the reaction mixture showed that the reaction was complete and the slight excess of carbon disulphide was removed under reduced pressure.

The product methyl tributyltin dithiocarbonate was a very pale yellow mobile liquid, and attempted distillation of the product resulted in a dissociation reaction from which tributyltin methoxide was recovered.

Example 4.—Reaction of bis(tributyltin) oxide with carbon disulphide

Carbon disulphide (1.3 mol) was added to bis(tributyltin) oxide (3.100 gm.) at room temperature. The reaction was accompanied by the evolution of heat and the reaction mixture became very viscous. The excess of carbon disulphide was removed by distillation under reduced pressure leaving bis(tributyltin) dithiocarbonate as a viscous colorless oil.

Attempted distillation of the product over a steam bath (100° C.) at a reduced pressure of 0.05 mm. of mercury resulted in the evolution of carbon dioxide, carbon disulphide, and carbon oxysulphide leaving a mixture of bis(tributyltin) oxide and bis(tributyltin) sulphide.

Example 5.—Reaction of tributyltin phenoxide and sulphur dioxide

Dry sulphur dioxide was bubbled through a solution of tributyltin phenoxide (1.1 gm.) in light petroleum (4 cc.) for a period of 4 hours. No heat was evolved but the infrared spectrum of the reaction mixture confirmed that a reaction had taken place. The solvent was removed by distillation under reduced pressure to leave tributyltin phenyl sulphide as an oil.

The analysis of the product of this reaction found sulphur present in a proportion of 7.55% by weight; the theoretical proportion is 7.15% by weight.

Example 6.—Reaction of bis(tributyltin) oxide with sulphur dioxide

Sulphur dioxide was passed through a solution of bis(tributyltin) oxide (1.32 gm.) dissolved in dry benzene (10 cc.) and heat was evolved from the ensuing reaction. The solvent and excess of sulphur dioxide were removed under reduced pressure to leave the product bis(tributyltin) sulphite as a very viscous oil. An infrared spectrum confirmed that a reaction had occurred and was compatible with the spectrum expected from the product.

Attempted distillation of the product at a temperature of 120° C. under a reduced pressure of 0.1 mm. of mercury resulted in the evolution of sulphur dioxide from the product to leave impure tributyltin oxide.

Analysis of the product produced the following results:

| | Percent by weight |
|---|---|
| Carbon | 43.7 |
| Hydrogen | 8.3 |
| Sulphur | 4.9 |

The theoretical values are as follows:

| | Percent by weight |
|---|---|
| Carbon | 43.9 |
| Hydrogen | 8.3 |
| Sulphur | 5.3 |

Example 7.—Reaction of triethyltin t-butyl peroxide with carbon dioxide

Dry carbon dioxide was passed for a period of 2 hours through a solution of triethyltin t-butyl (0.8796 gm.) in benzene was subsequently removed under reduced pressure to leave impure triethyltin t-butyl peroxycarbonate as an oil.

What I claim as my invention and desire to secure by Letters Patent is:

1. A process for preparing a compound having the general formula

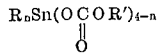

in which R and R' are selected from the group consisting of alkyl, aryl, and alkenyl and $n$ is 0, 1, 2, or 3 which method comprises reacting together $CO_2$ with an organotin compound having the formula $R_nSn(OR')_{4-n}$.

2. A process for preparing a compound having the general formula

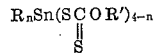

in which R and R' are selected from the group consisting of alkyl, aryl, and alkenyl, and $n$ is 0, 1, 2, or 3 which method comprises reacting together $CS_2$ with an organotin compound having the formula $R_nSn(OR')_{4-n}$.

3. A process for preparing a compound having the general formula

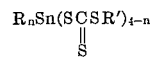

in which R and R' are selected from the group consisting of alkyl, aryl, and alkenyl, and $n$ is 0, 1, 2, or 3 which method comprises reaction together $CS_2$ with an organotin compound having the formula $R_nSn(SR')_{4-n}$.

4. A process for preparing a compound having the general formula

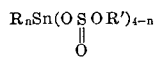

in which R and R' are selected from the group consisting of alkyl, aryl, and alkenyl, and $n$ is 0, 1, 2, or 3 which method comprises reacting together $SO_2$ with an organotin compound having the formula $R_nSn(OR')_{4-n}$.

5. A compound having the general formula

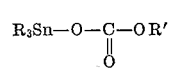

in which R and R' are selected from the group consisting of alkyl, aryl, and alkenyl.

6. A compound having the general formula

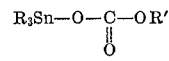

wherein R and R' are selected from lower alkyl groups.

References Cited

UNITED STATES PATENTS

| | | | |
|---|---|---|---|
| 2,759,906 | 8/1956 | Leistner et al. | 260—429.7 X |
| 2,786,813 | 3/1957 | McDermott | 260—429.7 X |
| 3,214,453 | 10/1965 | Stern | 260—429.7 |

FOREIGN PATENTS

| 214,706 | 4/1961 | Austria. |
|---|---|---|

OTHER REFERENCES

Calingaert et al., J.A.C.S., vol. 67 (1945), p. 192.

TOBIAS E. LEVOW, *Primary Examiner.*

W. F. W. BELLAMY, *Assistant Examiner.*

U.S. Cl. X.R.

167—22